Jan. 12, 1937.　　　F. M. BOWERS　　　2,067,230
ELECTRODE HOLDER
Filed June 25, 1936
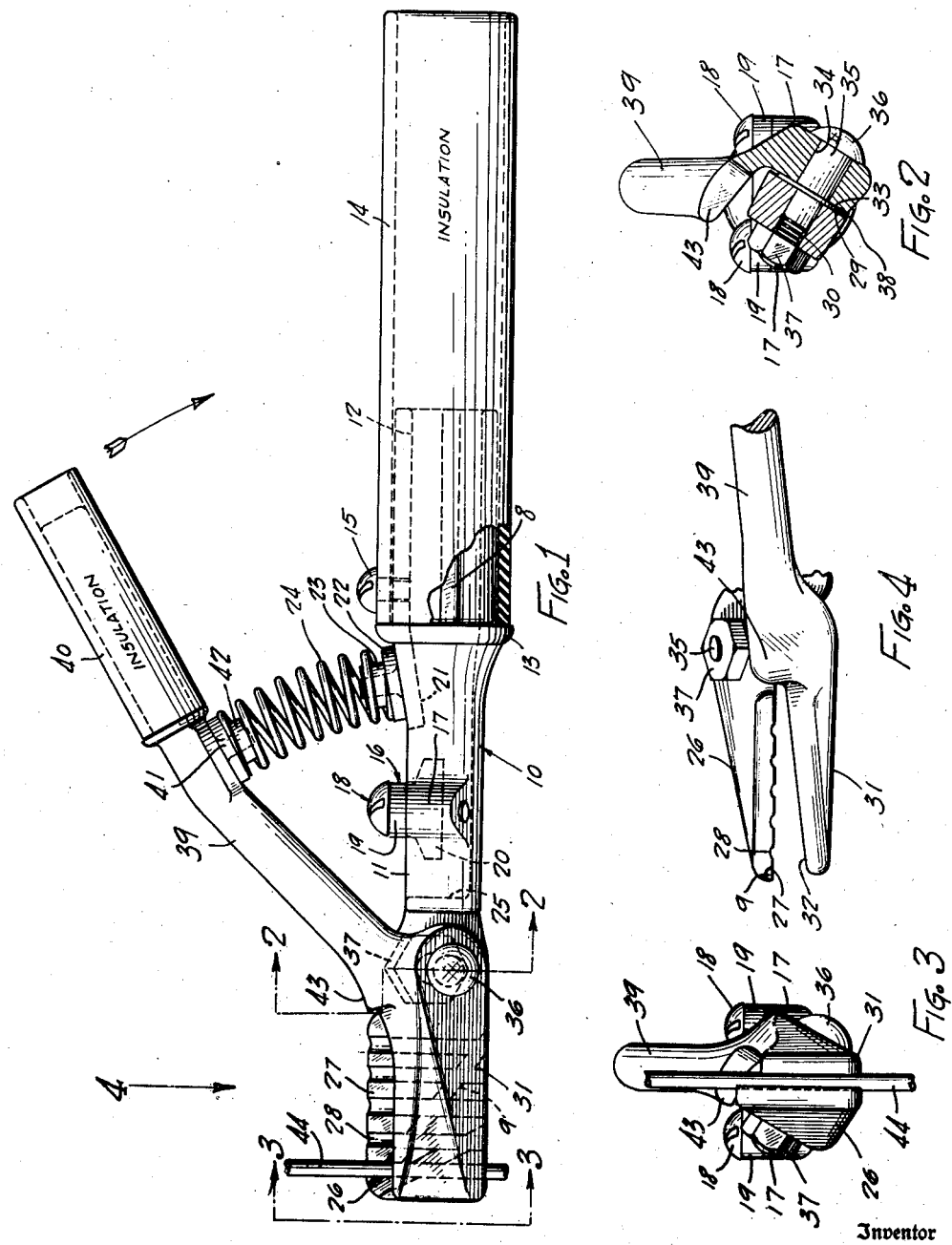
Inventor
FREDERICK M. BOWERS
By Joshua R. H. Potts
Attorney Patented Jan. 12, 1937

2,067,230

UNITED STATES PATENT OFFICE 2,067,230

ELECTRODE HOLDER

Frederick M. Bowers, Chester, Pa.

Application June 25, 1936, Serial No. 87,128

7 Claims. (Cl. 219—8)

This invention relates to electrode holders such as are commonly employed in the electric welding art, and the invention is concerned primarily with the provision of an electrode holder having certain novel features to which certain definite advantages attach.

Ordinarily an electrode holder, such as is intended for use in electric welding, includes a pair of jaws which are pivotally mounted, and with which are associated spring means for yieldably urging the jaws into gripping position, and suitable operating instrumentalities for opening the jaws against the influence of the spring means. The jaws detachably grip the electrode, and the holder is manipulated as an entirety to cause any desired movements on the part of the electrode which is being gripped thereby.

The use of electrode holders of the now-known types is accompanied by certain undesirable conditions, which are intended to be improved by this invention. The first of these is the awkwardness and inconvenience which attends the manipulation of the electrode holders now commonly in use. These holders ordinarily include operating instrumentalities for opening the jaws which operate in a plane which is substantially perpendicular to the plane assumed by the gripping faces of the jaws and the electrode which is gripped thereby, and inconvenience and awkwardness is inherent to this relative disposition of the parts.

With the above noted condition in mind, this invention has in view, as an important objective, the provision of an electrode holder in which the gripping faces of the jaws lie in a plane which is substantially coextensive with the plane of operative movement of the operating instrumentalities for the jaws.

Inasmuch as these electrode holders are used in electric welding, the provision of a good conductive contact between the jaws and the electrode is a prime desideratum. Very often the electrode becomes coated with materials having a high resistance, and conductivity of the contact is greatly impaired.

Accordingly this invention has in view, as a further objective, the provision of an electrode holder, which includes gripping jaws which move toward and away from each other in a direction which is inclined to the normal of the gripping faces. This so-called angular movement provides a wiping engagement of the jaws with the electrode, and which wiping action tends to scrape off or clear the surface of the electrode and free it from any foreign matter which might impair the conductivity of the contact.

The invention has in view, as a further objective, the provision of an electrode holder of the character described, which includes a pair of jaws which are pivotally mounted with respect to each other on a pivot, the axis of which is disposed at an angle of less than 90° with respect to the gripping faces of the jaws.

This pivotal mounting provides for the movement of the jaws toward and away from each other, but this movement is accompanied by relative lateral movement of the jaws to provide the wiping movement above set forth. Furthermore, any pull on the electrode which may be gripped by the jaws, will, due to the frictional engagement with the faces of the jaws, tend to cause the same to be pivoted in a direction which will further tighten the grip of the jaws. This provides for a firm and positive grip on the part of the holder.

Other more detailed objects and advantages are associated with the practical design of electrode holders made in accordance with the above noted precepts. These objects and advantages deal particularly with the proper insulation, and the arrangement of the conductor which is connected to the electrode holder. These will in part become apparent and in part be hereinafter described, as the description of the invention proceeds.

The invention, therefore, comprises an electrode holder which includes a pair of jaws having gripping jaws, and which jaws are pivotally mounted on a pivot pin, the axis of which is disposed at an angle to the normal of the gripping jaws. Operating members for the jaws are provided, and when the gripping jaws of the jaws are in engagement they lie in a plane which is substantially coextensive with the plane of operative movement of the jaw operating members.

For a full and more complete understanding of the invention, reference may be had to the following description and accompanying drawing wherein Figure 1 is a side view, mostly in elevation, but partly in section, of an electrode holder, made in accordance with this invention, Figure 2 is a transverse section taken about on the plane represented by the line 2—2 of Figure 1, Figure 3 is an end elevational view taken about on the plane represented by the line 3—3 of Figure 1, and Figure 4 is a top plan view of the gripping jaws per se.

Referring now to the drawing, wherein like reference characters denote corresponding parts, a main body member referred to as 10 is shown as being of a channel construction having an open top which is defined by the upper edges of side walls 11. Extending rearwardly of the main body portion 10 is a tubular extension 12, there being a rib-like structure 13 interposed between the tubular extension 12 and the main body portion 10.

The tubular extension 12 is formed with longitudinally extending ribs 8, and while the body member 10, and other structural parts which are integral therewith, such as the extension 12, are made from some good conducting material, such as an appropriate metal, a handle element 14, which is of the tubular construction shown in Figure 1, is made from a good insulating material.

This handle element 14 is positioned over the tubular extension 12, and the end thereof abuts the rib 13. The ribs 8 insure of a good engagement between the handle 14 and extension 12. Means for maintaining the handle element 14 assembled on the extension 12 is shown in the form of a screw 15.

The conductor which supplies current to the electrode holder is intended to pass through the tubular handle 14 and tubular extension 12 into the channel of the main body member 10, where it is anchored by a binding post designated 16.

As shown in the drawing, the side walls 11 are formed with barrel-like ears 17, into which are threaded headed screw members 18. The binding post 16 is formed with ears 19 on each side, which are interposed between the head of the screws 18 and the barrel-like ears 17. The main body portion of the binding post 16, referred to as 20, extends down into the channel construction and engages the conductor.

Adjacent to the rib 13 the main body portion 10 is formed with an upper wall 21, which carries a spring anchoring member, identified as 22. The latter is formed with a projection 23 which extends into one end of a coil spring, referred to as 24.

The channel formation of the main body portion 10 terminates in a front wall 25, and forwardly of the wall 25 there is provided a jaw member 26 which is preferably integrally formed with the body member 10.

This jaw member 26 has a gripping face identified as 27 which may be provided with a plurality of grooves 28, which are spaced apart and extend transversely thereacross. Additional angularly disposed grooves or kerfs 9, may also be formed on the face 27, to insure of a good gripping engagement with the electrode, as will be later described. Intermediate the gripping face 27 and the front wall 25, the jaw 26 is formed with a pivot face 29 that is at an inclined angular relationship with respect to the face 27; that is the angle defined by the surface 29 and the face 27 is an oblique angle of less than 90°.

The portion of the jaw 26 which is formed with the pivot face 29 is also provided with a pivot opening 30.

A second jaw member identified as 31 is formed with a gripping face, shown at 32. The jaw member 31 is also formed with a pivot face 33, which is in the same angular relationship to the face 32 as the pivot face 29 assumes with respect to the face 27 of the jaw member 26. This portion of the jaw 31 which is formed with the angularly inclined face 33 is also provided with a pivot opening 34.

A pivot pin at 35 extends through the openings 30 and 34 which are in alignment, and this pin 35 is headed as shown at 36, and its other end carries a nut 37 which is threaded thereon. A washer, shown at 38, is interposed between the faces 29 and 33, and serves to maintain these faces slightly spaced apart.

Integrally connected to the jaw member 31 and extending upwardly and rearwardly therefrom is an operating member 39, which carries a handle element 40, which handle element is also made from some good insulating material. The underside of the operating member 39 carries a spring anchoring member 41, which is formed with a projection 42 which extends into one end of the spring 24.

It is notable that at the point where the operating member 39 merges into the jaw member 31, an outstanding ear 43 is formed, which is adapted to engage the jaw 26 to limit the relative pivotal movement of the jaws in one direction. It is evident that the normal influence of the spring 24 causes this ear 43 to remain in abutting engagement with the jaw 26.

When an electrode, such as that shown fragmentarily at 44, Figure 1, is to be gripped, the handle member 40 is urged downwardly towards the handle member 14, in the direction of the arrow shown in Figure 1, and in opposition to the influence of the spring 24. This movement causes a relative pivoting movement of the jaws about the pin 35, and the gripping faces 32 and 27 are spread apart, as shown in Figure 4, and at the same time there has been a certain amount of lateral movement between the jaws.

The electrode 44 is now positioned in one of the grooves 28, whereupon the handle 40 is released to permit the spring 24 to urge the operating member 39 upwardly, whereupon the jaw 31 moves towards the jaw 26 and the face 32 engages the electrode 44 with a wiping action.

It is notable that if a downward pull be exerted upon the electrode 44 the frictional engagement of this member with the jaw 31 would tend to cause a corresponding movement of this part of the jaw element. Such movement obviously could result only in a further tightening of the grip. As a result a firm and positive grip of the electrode 44 by the jaw elements is provided. Also the wiping action of the jaws engaging the electrode insures of a good conductive connection between the electrode holder and the electrode.

While a preferred specific embodiment of the invention is hereinbefore set forth, it is to be understood that I am not to be limited to the exact construction illustrated and described, because various modifications of these details may be provided in putting the invention into practice within the purview of the appended claims.

I claim:

1. An electrode holder of the character described comprising a pair of jaws pivotally mounted with respect to each other, each of said jaws carrying a handle member with the handle members being relatively movable to provide for relative movement on the part of the jaws, said jaws having gripping faces which are disposed in substantially the same plane as the plane of movement of the handle members.

2. An electrode holder of the character described comprising a pair of jaws having gripping faces, and means for moving said jaws with respect to each other with a movement which is in an angular direction with respect to the normal of the gripping faces.

3. An electrode holder of the character described comprising a pair of jaws having gripping faces and a pivot pin for pivotally mounting said jaws with respect to each other, said pin being disposed at an angle to the gripping faces and also at an angle to the normal of the gripping faces.

4. An electrode holder of the character described comprising a pair of jaws, each being formed with a gripping face, each of said jaws also being formed with a pivot surface which is disposed at an angle of less than 90° to the gripping face of the respective jaws, said pivot surfaces being disposed in substantially parallel relationship, and a pivot pin extending through openings in the jaws formed at the pivot surfaces.

5. An electrode holder of the character described comprising a pair of jaw members having gripping faces, one of said gripping faces being formed with a groove extending transversely thereacross, said jaws being pivotally mounted on a pivot pin which is disposed at an angle to the gripping faces and also at an angle to the normal of the gripping faces.

6. An electrode holder of the character described comprising a pair of jaw members having gripping faces, one of said gripping faces being formed with angularly disposed kerfs, said jaws being pivotally mounted on a pivot pin which is disposed at an angle to the gripping faces and also at an angle to the normal of the gripping faces.

7. An electrode holder of the character described comprising a pair of jaw members having gripping faces, one of said gripping faces being formed with a groove extending transversely thereacross, said gripping face also being formed with an angularly disposed kerf, said jaws being pivotally mounted on a pivot pin which is disposed at an angle to the gripping faces and also at an angle to the normal of the gripping faces.

FREDERICK M. BOWERS.